US010452602B2

(12) United States Patent
Hu et al.

(10) Patent No.: US 10,452,602 B2
(45) Date of Patent: Oct. 22, 2019

(54) APPARATUS FOR FACILITATING A CONNECTION WITH AN EXTERNAL SENSOR MODULE

(71) Applicant: INTEL CORPORATION, Santa Clara, CA (US)

(72) Inventors: Qiuhua Hu, Shanghai (CN); Jie Chen, Shanghai (CN); Hua He, Shanghai (CN); Ke Han, Shanghai (CN); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/749,008

(22) PCT Filed: Dec. 30, 2016

(86) PCT No.: PCT/CN2016/113435
§ 371 (c)(1),
(2) Date: Jan. 30, 2018

(87) PCT Pub. No.: WO2018/120002
PCT Pub. Date: Jul. 5, 2018

(65) Prior Publication Data
US 2019/0087382 A1    Mar. 21, 2019

(51) Int. Cl.
*G06F 13/42* (2006.01)
*G06F 13/38* (2006.01)

(52) U.S. Cl.
CPC .......... *G06F 13/4291* (2013.01); *G06F 13/38* (2013.01); *G06F 13/385* (2013.01); *G06F 2213/0016* (2013.01)

(58) Field of Classification Search
CPC ........ G06F 13/385; G06F 13/10; G06F 13/12; G06F 13/122; G06F 13/4081; G06F 9/4413; G06F 2213/0016
See application file for complete search history.

(56) References Cited

U.S. PATENT DOCUMENTS 9,853,758 B1 * 12/2017 Channegowda ....... H04H 60/04
2004/0177202 A1 *  9/2004 Won .................... G06F 13/0481
710/302

(Continued)

FOREIGN PATENT DOCUMENTS

EP          2762881 A1    8/2014
WO      2016032608 A1    3/2016
(Continued)

OTHER PUBLICATIONS

International Search Report and Written Opinion, dated Sep. 27, 2017, issued in related International Application No. PCT/CN2016/113435, 13 pages.

*Primary Examiner* — Glenn A. Auve
(74) *Attorney, Agent, or Firm* — Schwabe, Williamson & Wyatt, P.C.

(57) ABSTRACT

Embodiments of the present disclosure provide for an apparatus for facilitating a connection with an external sensor module, in accordance with some embodiments. In one instance, the apparatus may include a processor and a sensor hub coupled with the processor, wherein the sensor hub may include a bus to provide a connection between the apparatus and the external sensor module. The apparatus may further include signal pattern generation circuitry coupled with the sensor hub to generate a signal pattern in response to a connection of the external sensor module to the apparatus via the bus or disconnect of the external sensor module from the bus, to indicate an insert or remove event to the apparatus, and facilitate the connection of the apparatus with the external sensor module. Other embodiments may be described and/or claimed.

12 Claims, 9 Drawing Sheets

(56) References Cited

U.S. PATENT DOCUMENTS

| | | | |
|---|---|---|---|
| 2009/0043919 A1* | 2/2009 | Takimoto | G06F 9/4411 |
| | | | 710/16 |
| 2011/0276738 A1* | 11/2011 | Kim | G06F 13/102 |
| | | | 710/300 |
| 2013/0007316 A1* | 1/2013 | Moon | G05B 19/042 |
| | | | 710/62 |
| 2013/0290762 A1* | 10/2013 | Pawar | G06F 1/3215 |
| | | | 713/323 |
| 2014/0073887 A1* | 3/2014 | Petersen | A61B 5/0015 |
| | | | 600/323 |
| 2014/0155708 A1* | 6/2014 | Petersen | A61B 5/01 |
| | | | 600/301 |
| 2014/0257127 A1* | 9/2014 | Smith | A61B 5/082 |
| | | | 600/532 |
| 2014/0281109 A1* | 9/2014 | Trethewey | G06F 13/126 |
| | | | 710/313 |
| 2015/0006778 A1* | 1/2015 | Leo | G06F 13/4027 |
| | | | 710/306 |
| 2015/0006872 A1 | 1/2015 | Sonobe et al. | |
| 2016/0192039 A1* | 6/2016 | Negi | H04M 1/72569 |
| | | | 340/870.07 |
| 2016/0249127 A1* | 8/2016 | Kim | H04R 1/1083 |
| 2016/0378153 A1* | 12/2016 | Kelly | G06F 1/266 |
| | | | 710/313 |
| 2016/0378704 A1* | 12/2016 | Adamson | G06F 13/364 |
| | | | 710/104 |
| 2017/0034618 A1* | 2/2017 | Negi | H04M 1/6058 |

FOREIGN PATENT DOCUMENTS

| | | |
|---|---|---|
| WO | 2016090565 A1 | 6/2016 |
| WO | 2016137609 A1 | 9/2016 |

\* cited by examiner

APPARATUS FOR FACILITATING A CONNECTION WITH AN EXTERNAL SENSOR MODULE

CROSS REFERENCE TO RELATED APPLICATIONS

The present application is a national phase entry under 35 U.S.C. § 371 of International Application No. PCT/CN2016/113435, filed Dec. 30, 2016, entitled "AN APPARATUS FOR FACILITATING A CONNECTION WITH AN EXTERNAL SENSOR MODULE," which designates the United States of America, the entire disclosure of which is hereby incorporated by reference in its entirety and for all purposes.

FIELD

Embodiments of the present disclosure generally relate to the field of sensor devices, and more particularly, to providing seamless connections of external sensor modules to computing devices.

BACKGROUND

Today, sensors are becoming more and more important components in various computing devices. To utilize sensors, a processing unit may be needed in a computing device, such as a sensor hub or a host central processing unit (CPU). In traditional computing devices, like tablet computers or smart phones, sensors may be attached to the same printed circuit board (PCB) as the processor, and may be connected with processor through low speed input-output (IO) interfaces, such as Inter-Integrated Circuit (I2C) or Serial Peripheral Interface (SPI). However, in the world of Internet of Things (IoT), more flexible connections between sensors and computing devices may be needed. For example, sensors or sensor modules may need to operate as individual components, which may be hot-pluggable into a computing device, replaceable, extendable, or even disposable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
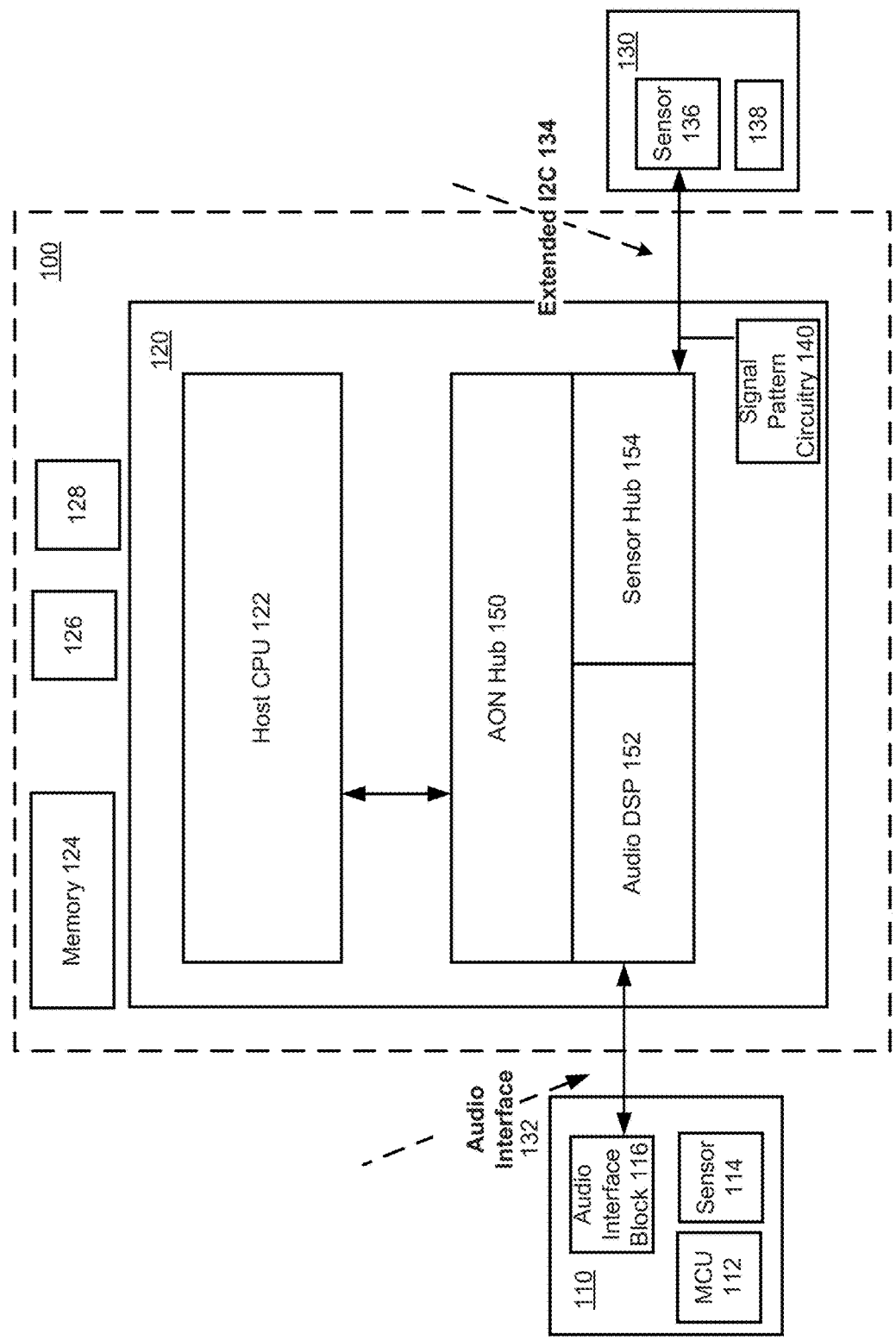
FIG. 1 is a block diagram illustrating an example apparatus for facilitating a connection with an external sensor module, in accordance with some embodiments.

Embodiments of the present disclosure include techniques and configurations for apparatus for facilitating a connection with an external sensor module, in accordance with some embodiments. In some embodiments, the apparatus may comprise a processor and a sensor hub coupled with the processor, wherein the sensor hub may include a bus to provide a connection between the apparatus and an external sensor module having one or more sensors to collect sensor data. The apparatus may further include signal pattern generation circuitry coupled with the sensor hub to generate a signal pattern in response to a connection of the external sensor module to the apparatus via the bus or disconnect of the external sensor module from the bus, to indicate an insert or remove event to the apparatus, and facilitate the connection of the apparatus with the external sensor module having one or more sensors to collect sensor data.

In some embodiments, the apparatus may comprise a processor having at least a first power state and a second power state, wherein the second power state is different than the first power state; and a sensor hub coupled with the processor. The sensor hub may detect a connection of an external sensor module to the apparatus via an audio interface, or a disconnect of the external sensor module from the audio interface, irrespective of a power state of the processor.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 is a block diagram illustrating an example apparatus for facilitating a connection with an external sensor module, in accordance with some embodiments. In embodiments, the apparatus 100 may be configured to process sensor data collected by sensors of one or more external sensor modules, each having one or more sensors to collect data, e.g., sensor 114 or 136 of external sensor module 110 or 130. The external sensor module 110 or 130 may be pluggable or removably coupled to apparatus 100. In embodiments, the apparatus 100 may comprise a laptop computer, a desktop computer, a tablet computer, a smartphone, a set-top box, a game controller, a 2-in-1 computing device, or a wearable device.

The apparatus 100 may include a processing block 120. The processing block 120 may comprise at least a processor 122 (e.g., host central processing unit (CPU)) and memory 124. The processing block 120 may further include components configured to receive and process the readings provided by sensors of an external sensor module couplable with the apparatus 100. The processing block 120 may provide these components through, for example, a plurality of machine-readable instructions stored in the memory 124 and executable on the processor 122, through hardware or firmware, or through a combination thereof.

The processor 122 may include, for example, one or more processors situated in separate components, or alternatively one or more processing cores embodied in a component (e.g., in an System-on-a-Chip (SoC) configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like. Examples of support circuitry may include host side or input/output (I/O) side chipsets (also known as northbridge and southbridge chipsets/components) to provide an interface through which the processor 122 may interact with other system components that may be operating at different speeds, on different buses, etc. in apparatus 100. Some or all of the functionality commonly associated with the support circuitry may also be included in the same physical package as the processor.

The memory 124 may comprise random access memory (RAM) or read-only memory (ROM) in a fixed or removable format. RAM may include volatile memory configured to hold information during the operation of apparatus 100 such as, for example, static RAM (SRAM) or dynamic RAM (DRAM). ROM may include non-volatile (NV) memory circuitry configured based on basic input/output system (BIOS), Unified Extensible Firmware Interface (UEFI), etc. to provide instructions when apparatus 100 is activated, programmable memories such as electronic programmable ROMs (erasable programmable read-only memory), Flash, etc. Other fixed/removable memory associated with the apparatus 100 may include, but is not limited to, electronic memories such as solid state flash memory, removable memory cards or sticks, etc.

The apparatus 100 may further include a communication block 126, to communicate information provided by external sensor modules to the apparatus 100, to external recipients. The communication block 126 may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the communication block 126 may operate in accordance with one or more applicable standards in any version. To this end, the communication block 126 may include, for instance, hardware, circuits, software, or any combination thereof that allows communication with external computer systems.

In some specific non-limiting examples, the communication block 126 may comport with the Institute of Electrical and Electronics Engineers (IEEE) 802.11 standard (e.g., Wi-Fi), a Bluetooth®, ZigBee®, near-field communication, or any other suitable wireless communication standard. In addition, the communication block 126 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

The apparatus 100 may further include a power circuitry block 128 configured to provide power supply to the components of the apparatus 100. In some embodiments, the power circuitry block 128 may be configured to power on some of the components of the apparatus 100, such as the processor 122, continuously or periodically, or in different power levels, in order to save battery power.

The power levels supplied to the processor 122 may correspond to power states of the processor 122, such as for example to an awake mode, a sleep mode, or a power-off mode of the processor 122. In some embodiments, the power circuitry block 128 may be configured to power on the processor 122 on a "wake-up" basis, e.g., in response to sensor signal provision by the external sensor modules 110 or 130. The power circuitry block 128 may include internal power sources (e.g., battery, fuel cell, etc.) and/or external power sources (e.g., power grid, electromechanical or solar generator, external fuel cell, etc.) and related circuitry configured to supply device 106 with the power needed to operate.

The processing block 120 may further include a sensor hub 150, which may be coupled with processor 122 and memory 124 and configured to aggregate and pre-process the data provided by the external sensor modules 110, 130. In embodiments, the sensor hub 150 may run autonomously, e.g., independent from processor 122 and memory 124 after booting up the processing block 120. The sensor hub 150 may comprise a common low-power sensor hub, e.g., always-on (AON) hub to allow continuous receipt and processing of sensor data from the external sensor module 110 and/or 130. For ease of understanding, the hub 150 will be called AON hub 150 hereinafter.

As shown, the AON hub 150 may include an audio part (e.g., audio interface digital signal processor (DSP)) 152, to provide a connection with the external sensor module 110 via an audio interface 132. In embodiments, the external sensor module 110 may include a microcontroller (MCU) 112, one or more sensors 114, and an audio interface block 116. The sensor data may be transferred from the sensors 114 via the audio interface 132 to the AON hub 150. The apparatus 100 may be configured to supply power to the external sensor module 110 via the audio interface 132. In embodiments, the AON hub 150 may be configured to detect a connection of the external sensor module 110 to the apparatus 100 via the audio interface 132, or a disconnect of the external sensor module 110 from the audio interface 132, irrespective of a power state of the processor 122, for example, without waking up the processor 122. The operation of the hub 150 in connection with the external sensor module 110 will be described in detail in reference to FIG. 9.

In addition or in the alternative, the hub 150 may include a sensor hub 154, to provide a connection with the external sensor module 130 via a bus 134. In some embodiments, the sensor hub 154 may comprise an integrated sensor hub (ISH). In some embodiments, the sensor hub 154 may comprise a non-integrated sensor hub on a platform. In some embodiments, the bus 134 may comprise an inter-integrated circuit (I2C) bus with extended capabilities, to provide for detection of an insert event or remove event associated with the external sensor module 130. In other words, the bus 134 may facilitate a detection of a hot-plug (e.g., connection) of the external sensor module 130 to the bus 134, or un-plug (disconnect) of the external sensor module 130 from the bus 134 respectively. Such hot-plug and un-plug detection may facilitate seamless processing of sensor signals provided by the external sensor module 130 to the apparatus 100.

To support the detection of the connection or disconnect of the external sensor module 130 to or from the bus 134, the apparatus 100 may include signal pattern generation circuitry 140 coupled with the AON hub 150 (e.g., with the sensor hub 154, as shown) to generate a signal pattern in response to a connection of the external sensor module 130 to the apparatus 100 via the bus 130 or a disconnect of the external sensor module 130 from the bus 134, to indicate a corresponding insert or remove event to the apparatus 100.

The sensor block 130 may include, for example, one or more sensors 136 and support circuitry 138, to at least support connectivity of the external block 130 with the apparatus 100 via the bus 134 (e.g., I2C support circuitry).

Communication channels (not shown) may connect the integrated AON hub 150 to other components of the apparatus 100. The AON hub 150 may be coupled with the processor 122 via system buses (not shown), and with the memory 124 via direct memory access (DMA), not shown. Example of system buses may include, but are not limited to, Universal Serial Bus (USB) or Peripheral Component Interconnect (PCI) interfaces. In embodiments, sensor data acquisition (DAQ) and sensor fusion may be offloaded from the processor 122 to the AON hub 150, which may perform, at least partially, sensor data pre-processing.

The apparatus 100 may further include different components necessary for the functioning of the apparatus, depending on a type of the apparatus. For example, the apparatus 100 may include a camera, a flash, a microphone, and other components (not shown) that may be typically included in a computing or wearable device of a particular type. The apparatus 100 may further include a display (not shown) to display results of sensor signal processing. The apparatus 100 may further include other components not described herein for purposes of brevity.

The described embodiments for facilitating a seamless connection of an external sensor module with a computing apparatus provide the following advantages. For example, there are many particle sensors available to users (e.g., particle sensors PM 2.5 or PM 10). However, these sensors may not typically be integrated into a phone or tablet computer due to size, power, and lifetime constraints. The described embodiments may provide for connecting computing devices with external sensor modules that may include particle sensors, for example, via a standard 3.5 mm audio interface. A user may dispose of the sensor module at any time and/or replace it with another one if the readings are no longer accurate.

In another example, there may be efferent vendors on the market place that may utilize same types of sensors. Vendors may need to quickly evaluate sensors and select the proper ones for their product, e.g., for IoT solutions. Current solutions permit evaluation of a sensor on board, using a specially designed printed circuit board (PCB) with the sensor attached (e.g., soldered) to the PCB. In contrast, the described embodiments, using, for example, the bus with extended capabilities, may provide for seamless replacement of sensors anytime, for debug and development purposes.

Figure 2:
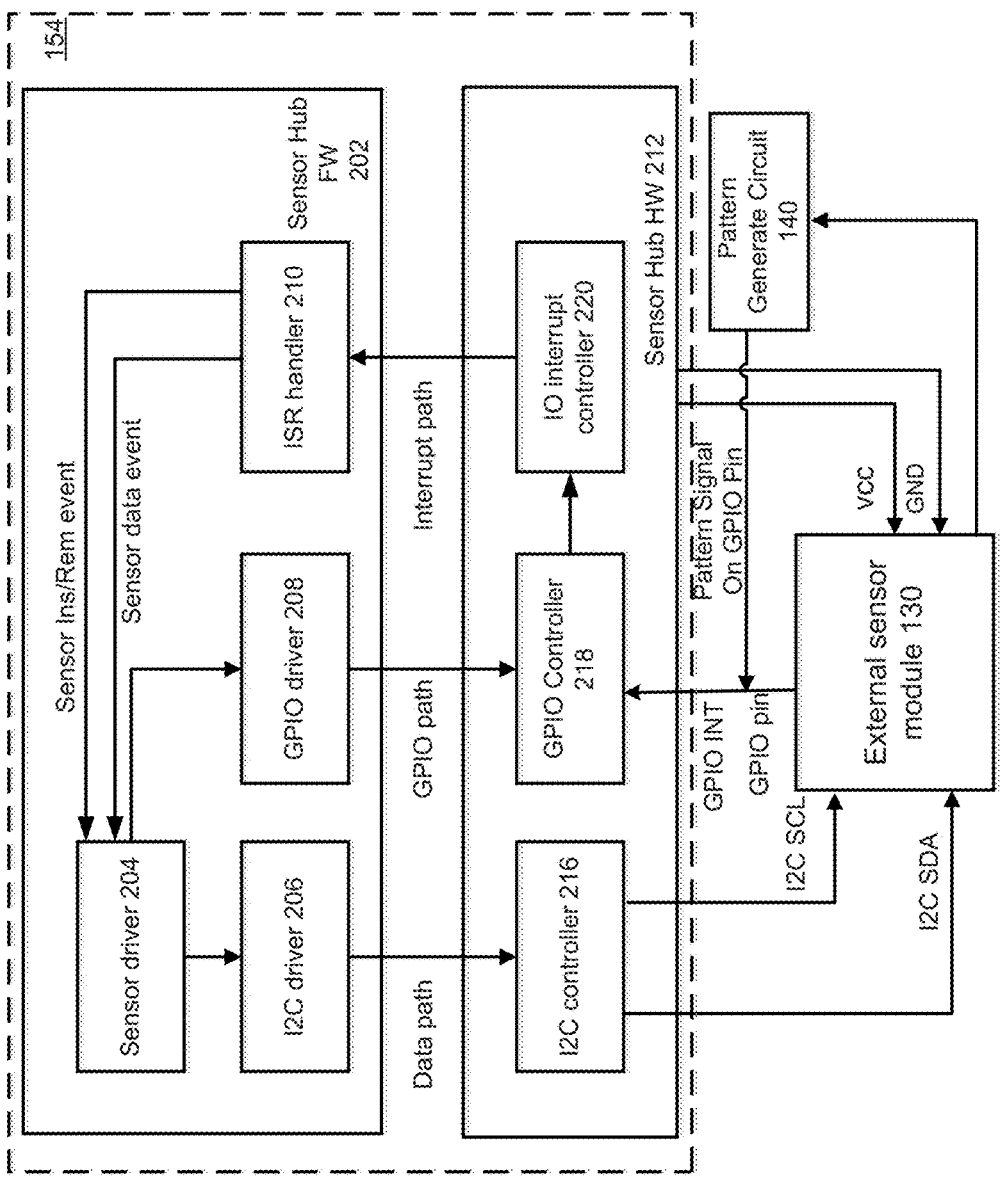
FIG. 2 illustrates some aspects of example apparatus for facilitating a connection with an external sensor module, in accordance with some embodiments.

In another example, drones are widely popular nowadays, with a sizable community of users, including do it yourself (DIY) users. Using the described embodiments, with the bus with extended capabilities, users may be able to upgrade sensors in their drones without impact on the main system. Further, the users may add more sensors (like temperature, gas, infrared (IR), Light Detection And Ranging (LiDAR) for terrestrial observation, etc.) to their drones to make them more adaptable to different usages, such as weather monitoring, disaster scene scouting, and so on. FIG. 2 illustrates some aspects of example apparatus for facilitating a connection with an external sensor module, in accordance with some embodiments. More specifically, the AON hub 150 of the apparatus 100 with extended bus capability to detect a connection of the external sensor module 130 with the apparatus 100, and disconnect of the external sensor module 130 from the apparatus 100, will be described. For ease of understanding, like components of FIGS. 1 and 2 (and subsequent figures) are indicated by like numerals.

In embodiments, the AON hub 150 (or more specifically, sensor hub 154) may include firmware (or software) component 202 and hardware component 212 as described below. The description is illustrative and provided by way of example only. Different combinations of software, firmware, and hardware components may be used to provide the extended capabilities for the bus 134.

The firmware component 202 may include a sensor driver 204, which may be a specific sensor software driver in sensor hub 154 firmware, and may be used to control and communicate with an external sensor module 130 based on its interface, e.g., I2C, including a general purpose input-output (GPIO) path.

The firmware component 202 may also include a bus (e.g., I2C) driver 206, which may be an I2C controller software driver in sensor hub (ISH) firmware. Based on the I2C driver, the sensor driver 204 may be able to communicate with the external sensor module 130.

The firmware component 202 may further include a GPIO driver 208, which may be a GPIO controller software driver in sensor hub (ISH) firmware. Based on the GPIO driver 208, the sensor driver 204 may be able to configure GPIO, for example, configure GPIO interrupt mode.

The firmware component 202 may also include an interrupt service routine (ISR) handler 210, which may be an interrupt handler in sensor hub (ISH) firmware. The ISR handler 210 may handle interrupts triggered by the external sensor module 130 (interrupt GPIO pin), and handle sensor data events through I2C or sensor insert/remove event through GPIO, as will be described below.

The hardware component 212 may include a bus (e.g., I2C) controller 216 to control and provide to the external sensor module 130 I2C data and clock signals, such as SCL and SDA respectively.

The hardware component 212 may further include a GPIO controller 218 to control GPIO data input and output.

The hardware component 212 may also include an IO interrupt controller 220. In embodiments, the IO interrupt controller 220 may comprise an I/O Advanced Programmable Interrupt Controller (IOAPIC), and may be used to distribute external interrupts, such as interrupt signal (GPIO INT) provided by GPIO controller 218.

As described in reference to FIG. 1, the AON hub 150 may be coupled with (or include) the signal pattern generation circuitry 140, which may be connected with interrupt GPIO path (GPIO pin) and used to trigger insert or remove signal pattern when an insert/remove event associated with an external sensor module (e.g., external sensor module 130) occurs.

If an I2C slave device (e.g., external sensor module 130) is plugged in the apparatus 100 or out of the I2C bus of apparatus 100 during transmission, the I2C controller 216 may not recognize the unexpected behavior happened in the bus, which may cause the sensing system (e.g., AON hub 150) to stop or hang.

Figure 3:
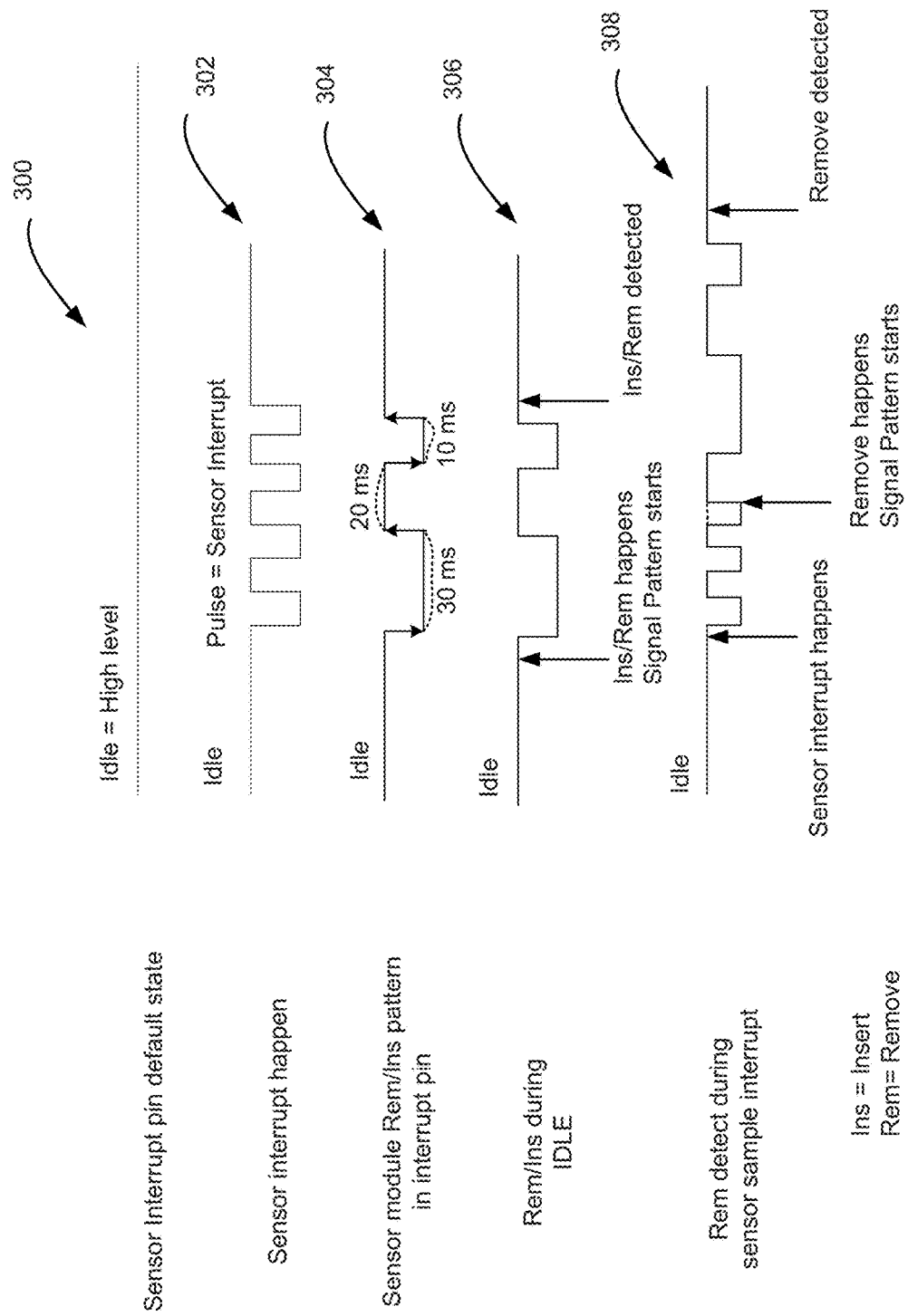
FIG. 3 is an example timing diagram of a signal pattern generated by the pattern generation circuitry of the apparatus of FIGS. 1 and 2, in accordance with some embodiments.

In the described embodiments, the I2C protocol may be extended by reusing the sensor interrupt pin (GPIO) (ordinarily used to issue an interrupt command GPIO INT) to indicate the sensor module insert/remove event. As shown, when the external sensor module 130 is connected to, or disconnected from, the I2C bus (represented by I2C SCL, I2C SDA, VCC, GND, and GPIO contact pins in FIG. 2), the pattern generation circuitry 140 may generate a corresponding signal pattern and provide it to the GPIO pin. This signal pattern may be provided to the GPIO controller 218, which may notify the IO interrupt controller 220, which in turn may notify ISR handler 210. The ISR handler 210 may notify the sensor driver 204 by issuing a signal Sensor Int/Rem event, as shown. The sensor driver 204 may take action to ensure the whole driver stack in firmware component 202 and I2C controller/device hardware 212 are in correct state to avoid the sensing system hang or unwanted interruptions. FIG. 3 is an example timing diagram of a signal pattern generated by the pattern generation circuitry of the apparatus of FIGS. 1 and 2, in accordance with some embodiments.

As shown in diagram 300, the default level of sensor interrupt pin may be high with or without external sensor module connected to the apparatus 100 of FIG. 1. As shown in diagram 302, the sensor interrupt signal (e.g., in a pulse form as shown) may be generated in when the sensor module begins data transmission. As shown in diagram 304, the signal pattern may be generated by the signal pattern generation circuitry 140 and provided to the sensor interrupt pin (GPIO). The pattern signal may be trigged, for example, by a switch on the board in response to the sensor module insertion into or removal from the apparatus 100. In embodiments, the signal pattern may be a series of pulse signals with edges distributed over particular time periods (e.g., 30 ms, 20 ms, and 10 ms as shown).

As shown in diagrams 306 and 308, the pattern characteristics (e.g., a combination of signal edges and corresponding time periods) may be recognized by the AON hub 150 in the idle state of the sensor (not transmitting) or during transmitting (e.g., removal may be detected during the sensor interrupt signal). Removal during sensor interrupt may occur if one or two of the following conditions are satisfied: 1. sensor data interrupt may stop after removal; or 2. pattern generation circuitry may pull up the voltage if signal is low after sensor removal, to make sure the integrity of pattern signal.

Figure 4:
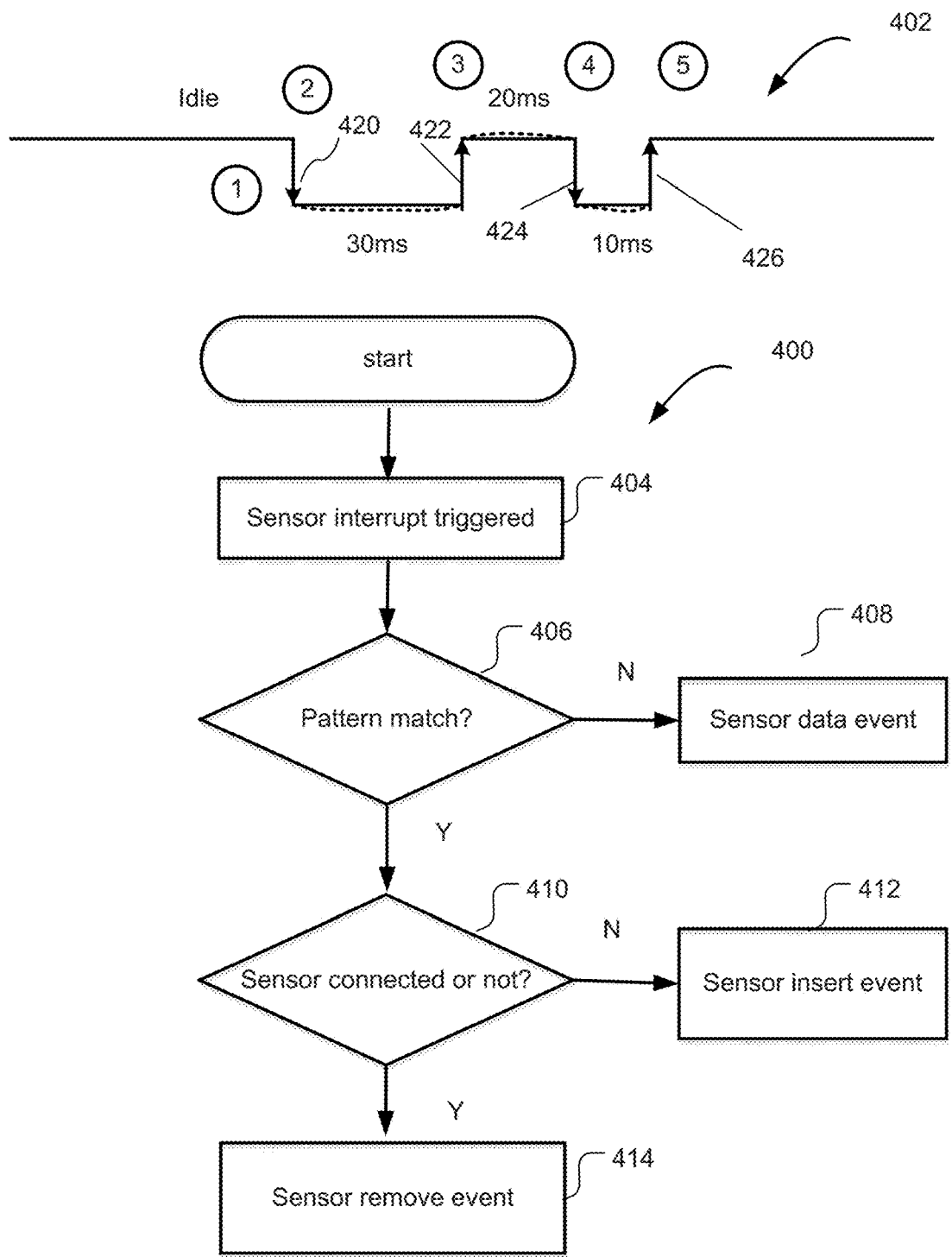
FIG. 4 illustrates an example process flow for detecting an insertion or removal of an external sensor module into or from the apparatus of FIGS. 1 and 2, in accordance with some embodiments.

FIG. 4 illustrates an example process flow for detecting an insertion or removal of an external sensor module into or from the apparatus of FIGS. 1 and 2, in accordance with some embodiments. The process 400 may be performed by a sensor hub, e.g., AON hub 150 of the apparatus 100. In some embodiments, the actions of the process 400 may be distributed among components of the AON hub 150 as described in reference to FIG. 1. In some embodiments, the actions of the process 400 may be performed by one or more controllers operating the AON hub 150. The process 400 is described with continuing reference to FIGS. 1-3.

The process flow 400 may begin at block 404, where the sensor interrupt signal (GPIO INT) may be triggered on the GPIO pin of the I2C bus as described in reference to FIG. 2. The sensor interrupt signal may be triggered by initiation of a sensor data transmission by the external sensor module (e.g., block 130). As described above, the capabilities of the I2C bus may be extended by using the sensor interrupt signal GPIO INT to also indicate an insert/remove event of the external sensor module (e.g., block 130). Accordingly, as described in reference to FIG. 3, the sensor interrupt signal may either indicate the sensor data transmission, or the insert/remove event. In the latter case, the sensor interrupt signal may include the signal pattern generated by the signal pattern generation circuit 140 and provided to the GPIO INT pin.

At decision block 406 it may be determined whether the signal includes the signal pattern. In other words, it may be determined whether the sensor interrupt signal matches the predetermined pattern characteristics. If the match is verified, it may be concluded that the sensor interrupt signal includes the signal pattern and thus manifests the insert/remove event.

The signal pattern verification is illustrated in the example signal pattern 402 and the following description. For purposes of explanation, the numerals on the example signal pattern 402 (e.g., 1, 2, 3, 4, and 5) correspond to the actions as numbered below.

1. The falling edge 420 may be recognized (e.g., by GPIO controller) in the AON hub 150.

2. The corresponding time stamp may be recorded. The GPIO controller may be configured to recognize the following rising edge 422.

3. The time delta between edges 422 and 420 may be checked to determine that it matches a predetermined value (e.g., 30 ms, as shown). If the match is verified, the GPIO controller may be configured to recognize the following falling edge 424. If no match is determined, at block 408 the sensor interrupt signal may be treated as indicating a sensor data event, rather than insert/remove event.

4. The time delta between edges 424 and 422 may be checked. If the match is verified (e.g., comprises 20 ms, as shown), the GPIO controller may be configured to recognize the following falling edge 426. If no match is determined, at block 408 the sensor interrupt signal may be treated as indicating a sensor data event, rather than insert/remove event.

5. The time delta between edges 426 and 424 may be checked. If the match is verified (e.g., comprises 10 ms, as shown), it may be confirmed that the sensor interrupt signal includes the signal pattern that indicates the insert/remove event. If no match is determined, the sensor interrupt signal may be treated as indicating a sensor data event, rather than insert/remove event (at block 408). The respective time deltas may confirmed multiple times (e.g., twice each), to make sure that the signal pattern is identified as such.

In summary, the time deltas between the signal edges may be verified to match respective predetermined values. If the matches are established, it may be concluded that the sensor interrupt signal includes the signal pattern that indicates insert/remove event.

If the pattern match is established as described above, at decision block 410 it may be determined whether the sensor block 130 is connected to the bus 150. In other words, it may be determined whether the insert/remove event manifested by the identified signal pattern comprises an insert event or remove event. For example, the initial state of the external sensor module (inserted or removed) may be determined once, at a power-on of the apparatus 100. For example, the GPIO pin voltage may be configured to indicate whether the sensor module is connected to the bus (e.g., keep low voltage as default state) or disconnected from the bus (e.g., keep high voltage as default state). The sensor hub may scan the contacts of the bus at a power-on of the apparatus 100, to determine an initial state of the bus, and therefore, the inserted or removed state of the external sensor module.

Knowing the initial state (external sensor module inserted or external sensor module removed), all subsequent insert/remove events may be identified as insert events or remove events by performing pattern match routines as described in reference to 402. Accordingly, referring again to FIG. 4, it may be determined whether the insert/remove event comprises an insert event (at block 412) or remove event (at block 414). Once the insert/remove event occurs and is identified as insert or remove event as described above, the sensor hub may take the action to ensure the system in the correct state, in order to prevent hanging or stoppage or otherwise negative impact on the user experience. For example, the sensor hub may perform a set of actions to initialize respective states of components of the sensor hub, in response to the determination that the insert/remove event manifests the connection of the external sensor module to the bus (insert event). The sensor hub may perform another set of actions to reset respective states of the components of the sensor hub, in response to the determination that the insert/remove event manifests the disconnect of the external sensor module from the bus (remove event).

Figure 5:
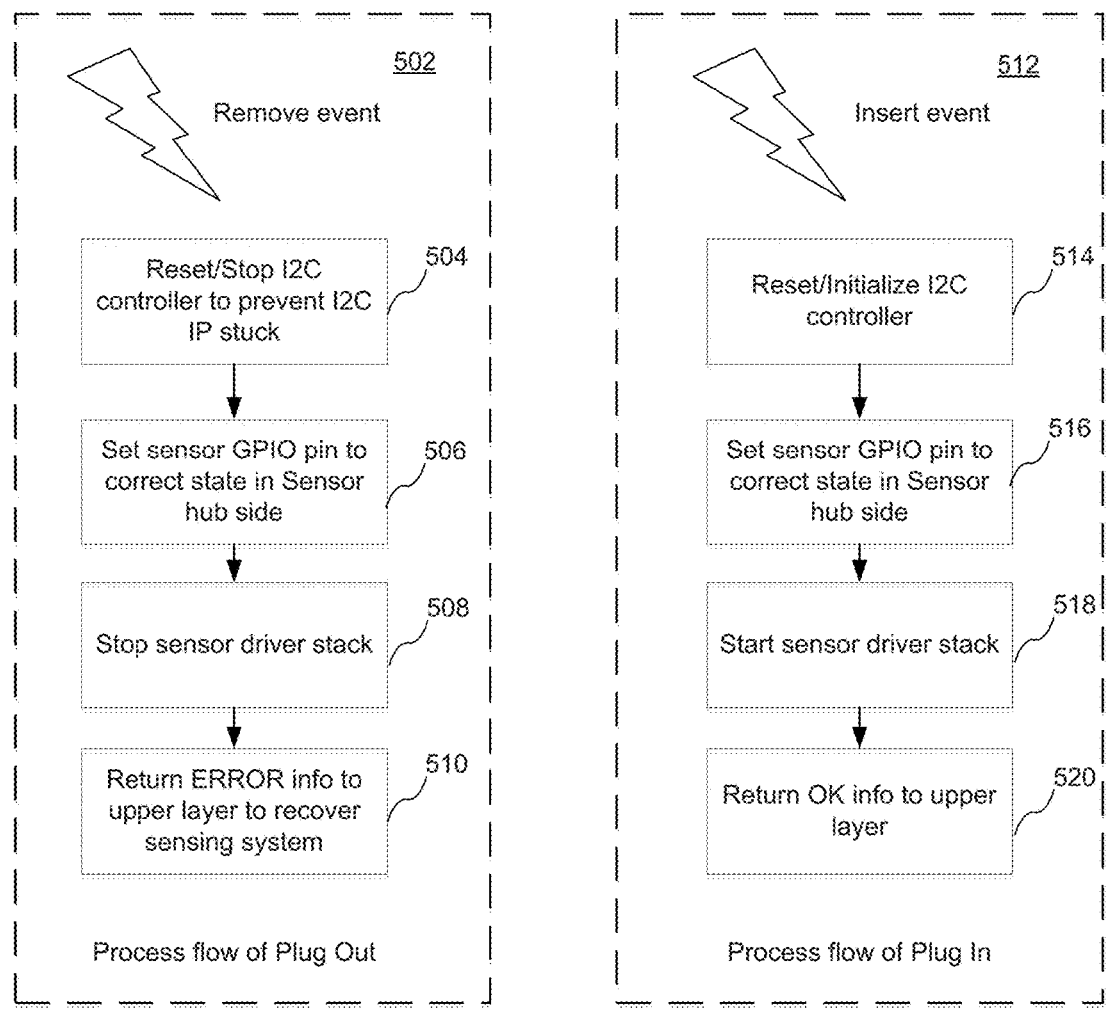
FIG. 5 illustrates example processes for setting components of a sensor hub of the apparatus of FIGS. 1-2 in response to insertion or removal of an external sensor module, in accordance with some embodiments.

FIG. 5 illustrates example processes for setting components of a sensor hub of the apparatus of FIGS. 1-2 in response to insertion or removal of an external sensor module, in accordance with some embodiments. The process 502 illustrates example actions to reset and/or stop components of the sensor hub in response to the remove event. The process 512 illustrates example actions to reset and/or initialize components of the sensor hub in response to the insert event.

The process 502 may begin at block 504 and include reset and/or stop I2C controller to prevent I2C controller (I2C IP) hanging. At block 506, the GPIO pin may be set to correct state on the sensor hub side. At block 508, the sensor driver stack (e.g., firmware component 202) may be stopped in order to make sure I2C controller driver level operations are reset. At block 510, ERROR message may be returned to the upper layer to recover sensing system. For example, sensor hub (e.g., ISH) firmware may use I2C/GPIO drivers and ISR handler. For example, a compass application may obtain compass data and pass the data to host CPU. Other actions necessary to provide a correct state of the sensor hub in response to the remove event may also be undertaken.

The process 512 may begin at block 514 and include reset and/or I2C controller. At block 516, the GPIO pin may be set to correct state on the sensor hub side. At block 518, the sensor driver stack (e.g., firmware component 202) may be stopped. At block 520, OK message may be returned to the upper layer as described in reference to block 510 of the process 502. Other actions necessary to provide a correct state of the sensor hub in response to the insert event yap also be undertaken.

The described embodiments may allow for using multiple sensors on the same external sensor module board. In other words, external sensor boards with multiple sensors may be seamlessly connected to, or disconnected from, the apparatus of FIGS. 1 and 2.

Figure 6:
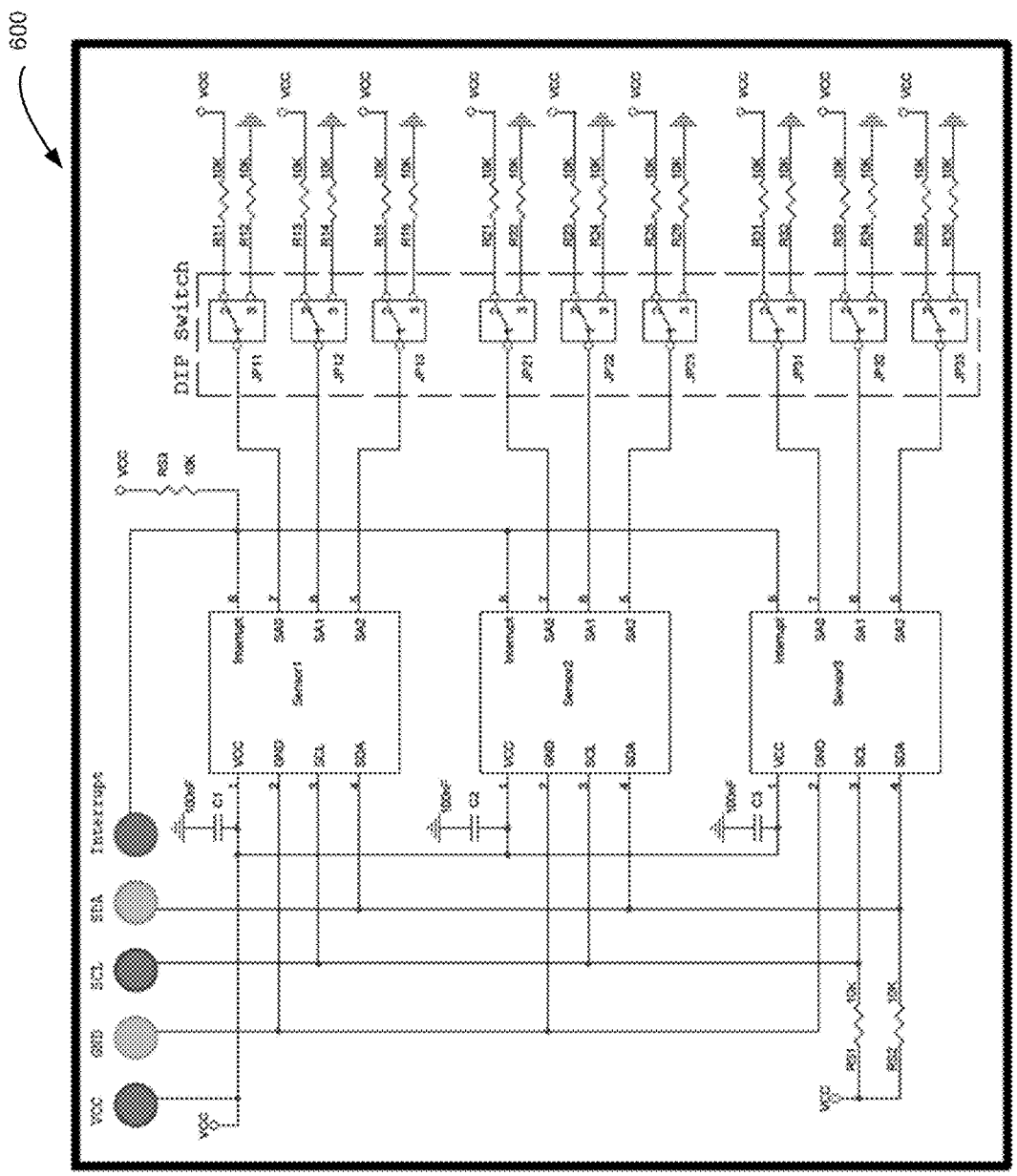
FIG. 6 is a block diagram of an example external sensor module with multiple sensors configured to be connected to or disconnected from the apparatus of FIGS. 1 and 2, in accordance with some embodiments.

FIG. 6 is a block diagram of an example external sensor module with multiple sensors configured to be connected to or disconnected from the apparatus of FIGS. 1 and 2, in accordance with some embodiments. As shown, the sensors 1, 2, and 3 may share the five-pin connection to the sensor hub in the host device (e.g. apparatus 100). As described earlier, sensors 1, 2, 3 may be particle sensors, gas sensors, temperature sensors, IR sensors, or any other types of sensors. The sensor hub may identify different sensors by their respective I2C slave addresses. The GPIO pin may be a shared feature for the multiple sensors. Support for this shared feature may be provided as follows. The interrupt pin of the sensors in the module board (pin 8 in FIG. 6) may be configured as the open drain output, active low normally. For push-pull sensors, the external diode or open drain inverter may be required. The sensor driver may identify the interrupt source using the I2C controller, interacting with sensors once interrupt signal occurs. The sensor module insert/remove recognition may be provided according to the embodiments described in reference to FIGS. 4-5. Once the sensor hub becomes aware that the external sensor module is inserted or removed, it may identify the sensor type, e.g., by address scan and take appropriate actions.

The sensor I2C address may be managed to avoid conflict. For example, the slave address may be determined using specific pins on the sensor. A dual in-line package (DIP) switch in the sensor module board may be provided to switch the slave address to avoid I2C address conflict in the bus.

Using external sensor modules may involve using sensors of different types, including types that may not yet be known to a host device (e.g., apparatus 100). In other words, a sensor driver corresponding to a new to the device type of sensor may be required to be used. Sensor driver support may be accomplished through upgrading the sensor driver over available network, such as internet, for example.

Figure 7:
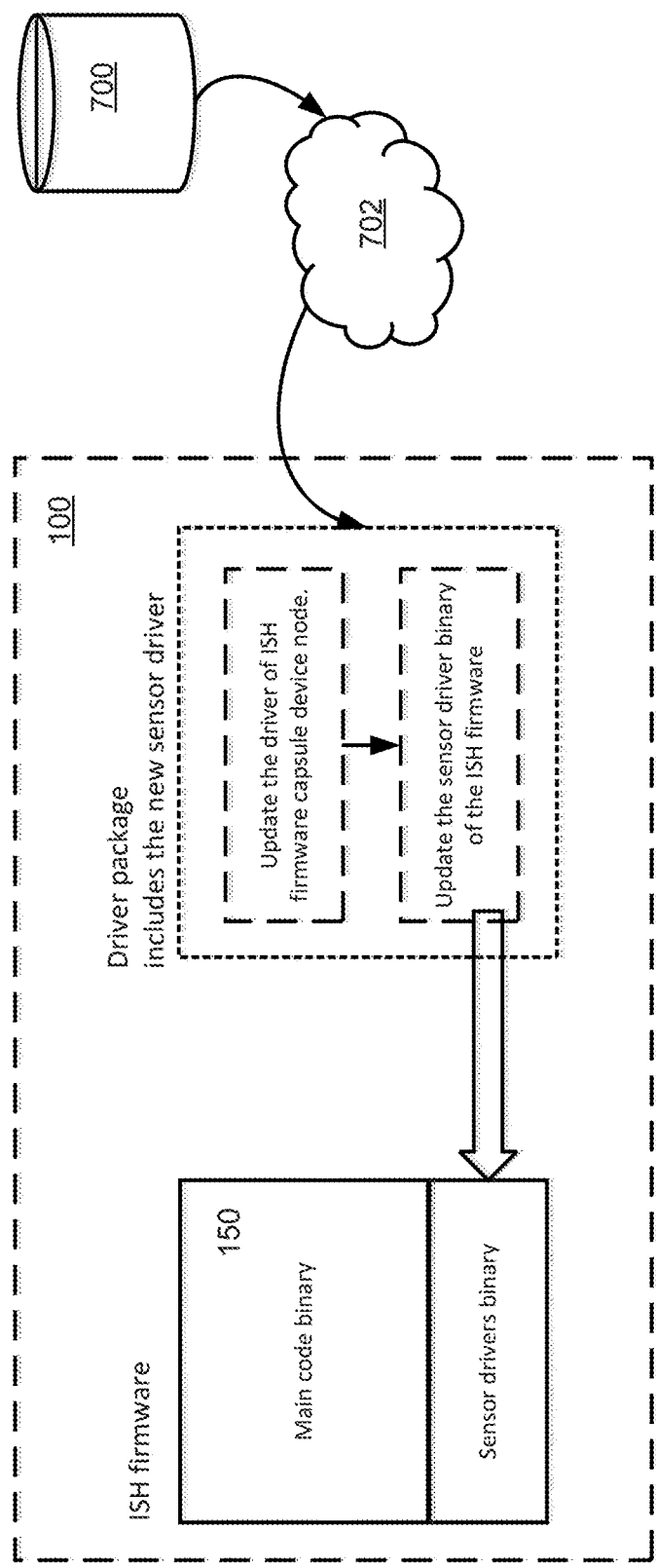
FIG. 7 illustrates an example diagram for supporting sensor driver upgrade in the apparatus of FIGS. 1 and 2, in accordance with some embodiments.

FIG. 7 illustrates an example diagram for supporting sensor driver upgrade in the apparatus of FIGS. 1 and 2, in accordance with some embodiments. More specifically, FIG. 7 illustrates an example ISH firmware sensor driver upgrade under Windows® Operating System. As shown, the AON hub 150 of the apparatus 100 may support the sensor driver dynamic upgrade. For example, the apparatus 100 may initiate a download of the new sensor driver from a cloud service 700, e.g., via an appropriate network 702, such as the internet. Once upgraded, the sensor hub firmware may operate the new sensor type using the new driver.

As discussed above, the apparatus 100 of FIG. 1 may be implemented in a smart phone, tablet or personal computer, or the like. In some embodiments, an apparatus for providing a seamless connection with an external sensor module may be implemented on a base sensor controller.

Figure 8:
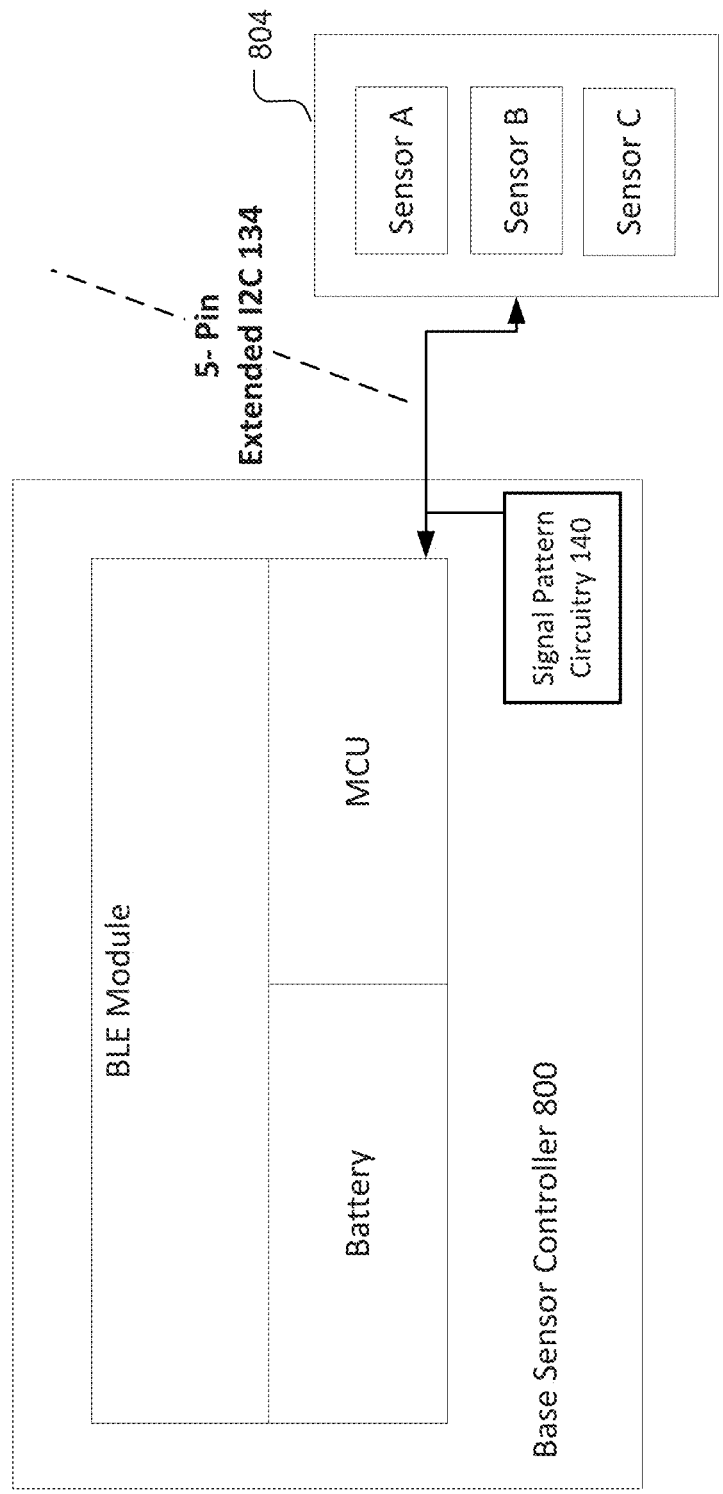
FIG. 8 is a block diagram of an example base sensor controller for facilitating a connection with an external sensor module, in accordance with some embodiments.

FIG. 8 is a block diagram of an example base sensor controller for facilitating a connection with an external sensor module, in accordance with some embodiments. As shown, the base sensor controller 800 may comprise, for example, a Bluetooth® low energy (BLE) module. The base sensor controller 800 may have necessary interconnect ability and the capability to collect and transmit the sensor data. The user may plug in any kind of external sensor modules (e.g., external sensor module 804) with the proposed connector (I2C bus 134 in combination with signal pattern circuitry 140). The base sensor controller may be a configurable and portable sensor solution that may be used at home or in commercial environment. The base sensor controller 800's MCU may collect and handle the sensor data (e.g., I2C sensor data collection and fusion), and send out fusion result through BLE module.

As briefly described in reference to FIG. 1, in some embodiments, an external sensor module (e.g. external sensor module 110) may be connected to or disconnected from the apparatus 100 using the audio interface 132. The embodiments using the audio interface for seamless connection of an external sensor module to a computing device are described in greater detail below.

Figure 9:
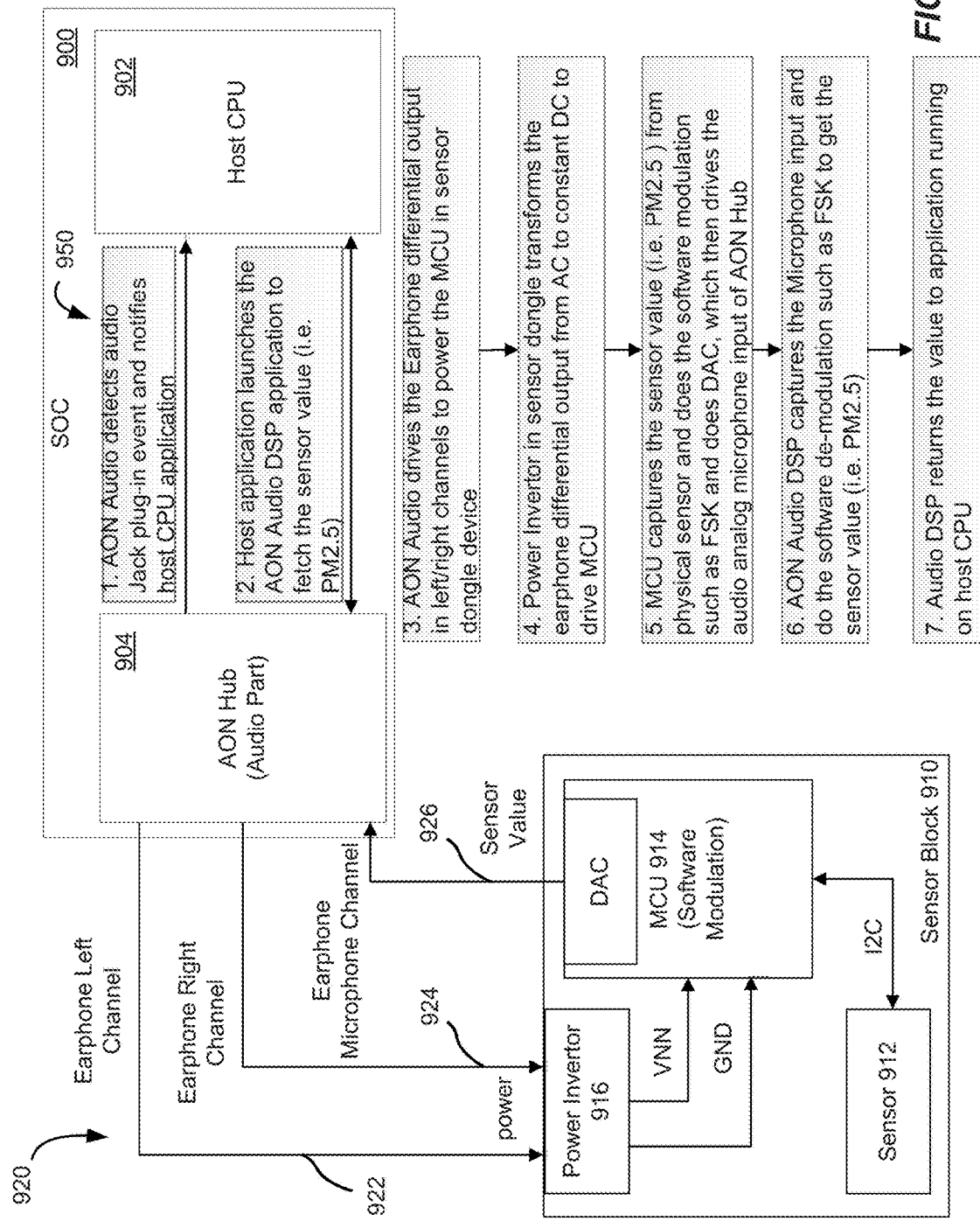
FIG. 9 is a block diagram illustrating a sensing system wherein an external sensor module is connected to a host computing device via an audio interface, in accordance with some embodiments.

FIG. 9 is a block diagram illustrating a sensing system wherein an external sensor module is connected to a host computing device via an audio interface, in accordance with some embodiments.

The system may include a host computing device 900 (e.g., similar to the apparatus 100 of FIG. 1). The host computing device 900 may be integrated on a SOC. As shown, the computing device 900 may include a host CPU 902 and a sensor hub (e.g., AON hub) 904. The hub 904 may include an audio part (e.g., audio interface digital signal processor (DSP)), to provide a connection with an external sensor module 910 via an audio interface 920.

The external sensor module 910 may include one or more sensors 912, and an MCU 914 coupled via a bus (e.g., I2C as shown) with the sensors 912. The external sensor module 910 may further include a power invertor 916 coupled with the MCU 914 and passive components (not shown for simplicity).

The audio interface 920 may include earphone channels 922, 924, and an earphone-microphone channel 926. In embodiments, the audio interface 920 may be a traditional 3.5 mm audio interface.

The external sensor module 910 may not need an internal power source to supply power. Power may be provided via the audio interface 920 (e.g., through an earphone output via earphone channels 922, 924) from the host device 900 to drive the MCU 914, which may comprise a low power MCU. The power invertor 916 may transform the differential alternate current (AC) signal from the earphone output to the constant direct current (DC) signal, for example about 3V and about 15 mW) to drive the MCU 914 and passive components of the external sensor module 910.

In embodiments, the sensor hub 904 may detect a connection of the external sensor module 910 to the host device 902 via the audio interface 920, or a disconnect of the external sensor module from the audio interface 920, irrespective of a power state of the CPU 902. The hot-plug detection of sensor block presence may be manifested by an audio interface event. The MCU 914 may modulate the sensor value (e.g., data provided by the sensor type) of the sensor 920 using frequency shift keying (FSK) or phase shift keying (PSK) or other known technique, conduct the digital to analog conversion using the digital to analog converter (DAC) and transmit the sensor value through the audio analog interface (channel 926) to the host device 900.

In summary, an analog audio interface may be used to transmit the digital sensor value modulated by software and the audio jack event may be utilized for sensor module hot plug-in detection. The sensors of the sensor module or the sensor module itself may be replaced and/or upgraded, leverage the common audio interface to obtain the sensor value without the need to change or upgrade the components of the host device.

The process 950 of detection of a plug-in of the external sensor module 910 and provision of a sensor value is shown in FIG. 9. At block 1, the hub 904 (audio part) may detect an audio jack plug-in event and notify the host CPU 902. As noted, the hub 904 may comprise an AON hub and may be kept on all the time, regardless of the power state of the host CPU 902 (e.g., sleep mode or wake-up mode).

The AON hub may detect the audio plug-in event and notify the host CPU 902 if the host application has registered such kind of event, and wake it up if it is in the sleep mode, but has been registered to such event before entering the sleep mode. Registration may occur before the sensor module is plugged in. If the host application has not done the registration prior to entering the sleep mode, it may not be woken up by the AON hub with the registered event. Accordingly, the sensor hub may process the plug-in of the sensor module to the audio jack regardless of the power state of the host CPU 902. The host CPU may not need to be involved in the insert/removal detection. Audio jack detection may be leveraged to detect a plug-in of the external sensor module, without requiring a special detection procedure.

At block 2, the host CPU 902 (host application) may launch an audio DSP application to sense a sensor value (e.g., from the one or more sensors 912, which may comprise, for example, PM 2.5 sensors).

At block 3, the audio DSP may drive the earphone differential output in channels 922, 924 to power the MCU 914 in the external sensor module 910.

At block 4, the power invertor 916 may transform the earphone differential output from AC to DC to drive MCU 914.

At block 5, MCU 914 may capture the sensor value from the sensors 912 and may perform the software modulation and DAC, and drive the audio analog microphone input (channel 926) of the AON hub.

At block 6, the AON audio DSP may capture the microphone input and do the software de-modulation such as FSK to get the sensor value of the respective sensor of the sensors 912.

At block 7, audio DSP may return the sensor value to an application running on the host CPU.

The embodiments described herein may be further illustrated by the following examples.

Example 1 may be an apparatus Example 1 may be an apparatus for facilitating a connection with an external sensor module, comprising: a processor; a sensor hub coupled with the processor, wherein the sensor hub includes a bus to provide the connection between the apparatus and the external sensor module having one or more sensors to collect sensor data; and signal pattern generation circuitry coupled with the sensor hub to generate a signal pattern in response to a connection of the external sensor module to the apparatus via the bus or disconnect of the external sensor module from the bus, to facilitate the connection of the apparatus with the external sensor module having the one or more sensors.

Example 2 may include the apparatus of Example 1, wherein the sensor hub comprises an integrated sensor hub (ISH), wherein the bus comprises an inter-integrated circuit (I2C) bus.

Example 3 may include the apparatus of Example 2, wherein the bus includes multiple contacts to connect the external sensor module with the apparatus, wherein the circuitry is to provide the generated signal pattern to the sensor hub via one of the contacts of the bus.

Example 4 may include the apparatus of Example 3, wherein the one of the contacts is a general purpose input-output (GPIO) pin.

Example 5 may include the apparatus of Example 3, wherein the connection of the external sensor module to the apparatus via the bus comprises an insert event, wherein the disconnect of the external sensor module from the bus comprises a remove event, wherein the sensor hub is to: determine that an electronic signal on the one of the contacts comprises the signal pattern that indicates the insert or remove event; and establish whether the insert or remove event manifests the connection of the external sensor module to the bus or disconnect of the external sensor module from the bus, based at least in part on a result of the determination.

Example 6 may include the apparatus of Example 5, wherein the sensor hub is to scan the contacts of the bus at a power-on of the apparatus, to determine an initial state of the bus, wherein to establish whether the insert or remove event manifests the connection of the external sensor module to the bus or disconnect of the external sensor module from the bus is further based on a result of the determination of the initial state of the bus.

Example 7 may include the apparatus of Example 6, wherein the sensor hub is to perform a first procedure to initialize respective states of components of the sensor hub, or perform a second procedure to reset respective states of the components of the sensor hub, in response to the determination that the insert or remove event manifests the connection of the external sensor module to the bus or the disconnect of the external sensor module from the bus respectively.

Example 8 may include the apparatus of Example 1, wherein the external sensor module includes one or more sensors and corresponding support circuitry, wherein the support circuitry includes a mating component to connect with the bus.

Example 9 may include the apparatus of Example 1, wherein the processor comprises a host central processing unit (CPU), wherein the CPU, sensor hub, and signal pattern generation circuitry are integrated on a system on chip (SOC), wherein the apparatus comprises one of: a laptop computer, a desktop computer, a tablet computer, a smartphone, a set-top box, a game controller, or a wearable device.

Example 10 may include the apparatus of any Examples 1 to 9, wherein the apparatus comprises a base sensor controller.

Example 11 may include the apparatus of any Examples 1 to 9, wherein the one or more sensors include one or more of an infrared (IR) sensor, a particle sensor, a temperature sensor, or gas sensor.

Example 12 may be one or more non-transitory controller-readable media having executable instructions for facilitating a connection of an apparatus with an external sensor module stored thereon that, in response to execution, cause a controller to: determine that an electronic signal provided to a bus of the apparatus comprises a signal pattern that indicates an insert or remove event associated with the external sensor module, wherein the bus is to provide a connection between the apparatus and the external sensor module; and establish whether the insert or remove event manifests a connection of the external sensor module to the bus or a disconnect of the external sensor module from the bus, based at least in part on a result of the determination.

Example 13 may include the non-transitory controller-readable media of Example 12, wherein the bus includes multiple contacts to connect the external sensor module with the apparatus, wherein the instructions further cause the controller to scan the contacts of the bus at a power-on of the apparatus, to determine an initial state of the bus, wherein to establish whether the insert or remove event manifests the connection of the external sensor module to the bus or disconnect of the external sensor module from the bus is further based on a result of the determination of the initial state of the bus.

Example 14 may include the non-transitory controller-readable media of Example 13, wherein the instructions further cause the controller to: perform a first procedure to initialize respective states of the contacts of the bus, or perform a second procedure to reset respective states of the contacts of the bus, in response to the determination that the insert or remove event manifests the connection of the external sensor module to the bus or the disconnect of the external sensor module from the bus respectively.

Example 15 may include the non-transitory controller-readable media of Example 12, wherein the instructions further cause the controller to receive the electronic signal from the bus of the apparatus.

Example 16 may include the non-transitory controller-readable media of any Examples 12 to 15, wherein the instructions that cause the controller to determine that the electronic signal provided to a bus of an apparatus comprises a signal pattern that indicates an insert or remove event further cause the controller to identify falling edges of the signal pattern and time periods between the falling edges.

Example 17 may include the non-transitory controller-readable media of any Examples 12 to 15, wherein the one or more sensors include one or more of an infrared (IR) sensor, a particle sensor, a temperature sensor, or gas sensor.

Example 18 may be an apparatus for facilitating a connection with an external sensor module, comprising: a processor having at least a first power state and a second power state, wherein the second power state is different than the first power state: and a sensor hub coupled with the processor, wherein the sensor hub is to detect a connection of the external sensor module to the apparatus via an audio interface, or a disconnect of the external sensor module from the audio interface, irrespective of a power state of the processor.

Example 19 may include the apparatus of Example 18, wherein the apparatus is to supply power to the external sensor module and receive sensor data from the external sensor module via the audio interface, in response to a connection of the external sensor module to the apparatus.

Example 20 may include the apparatus of Example 19, wherein the external sensor module includes a controller, one or more sensors coupled with the controller to generate sensor data, and the audio interface to provide the sensor data to the apparatus.

Example 21 may include the apparatus of Example 20, wherein the controller is to identify sensor value associated with the one or more sensors, and transform the sensor values into an audio form, to provide to the apparatus.

Example 22 may include the apparatus of Example 21, wherein the sensor hub is to receive the sensor values via the audio interface, and transform the sensor values into a digital form, to provide to the processor, to facilitate processing of the sensor data.

Example 23 may include the apparatus of any Examples 18 to 22, wherein the first power state of the processor corresponds to a wake-up mode of the processor, and the second power state corresponds to a sleep mode of the processor.

Example 24 may include the apparatus of any Examples 18 to 22, wherein the one or more sensors include one or more of an infrared (IR) sensor, a particle sensor, a temperature sensor, or a gas sensor.

Example 25 may be an apparatus for facilitating a connection with an external sensor module, comprising: means for determining that an electronic signal provided to a bus of the apparatus comprises a signal pattern that indicates an insert or remove event associated with the external sensor module, wherein the bus is to provide a connection between the apparatus and the external sensor module; and means for establishing whether the insert or remove event manifests a connection of the external sensor module to the bus or a disconnect of the external sensor module from the bus, based at least in part on a result of the determination.

Example 26 may include the apparatus of Example 25, wherein the bus includes multiple contacts to connect the external sensor module with the apparatus, wherein the apparatus further includes means for scanning the contacts of the bus at a power-on of the apparatus, to determine an initial state of the bus, wherein the means for establishing whether the insert or remove event manifests the connection of the external sensor module to the bus or disconnect of the external sensor module from the bus includes means for determining the initial state of the bus.

Example 27 may include the apparatus of any Example 26, further comprising: means for performing a first procedure to initialize respective states of the contacts of the bus, or means for performing a second procedure to reset respective states of the contacts of the bus, in response to the determination that the insert or remove event manifests the connection of the external sensor module to the bus or the disconnect of the external sensor module from the bus respectively.

Example 28 may include the apparatus of Example 25, further comprising means for receiving the electronic signal from the bus of the apparatus.

Example 29 may include the apparatus of any of Examples 25 to 28, wherein the means for determining that the electronic signal provided to a bus of an apparatus comprises a signal pattern that indicates an insert or remove event further includes means for identifying falling edges of the signal pattern and time periods between the falling edges.

Example 30 may include the apparatus of any of Examples 25 to 28, wherein the one or more sensors include one or more of: an infrared (IR) sensor, a particle sensor, a temperature sensor, or gas sensor.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus for facilitating a connection with an external sensor module, comprising:
   a processor;
   a sensor hub coupled with the processor, wherein the sensor hub includes a bus to provide the connection between the apparatus and the external sensor module having one or more sensors to collect sensor data, wherein the bus includes multiple contacts to connect the external sensor module with the apparatus; and
   signal pattern generation circuitry coupled with the sensor hub to generate a signal pattern in response to a connection of the external sensor module to the apparatus via the bus or disconnect of the external sensor module from the bus, to facilitate the connection of the apparatus with the external sensor module having the one or more sensors, and to provide the generated signal pattern to the sensor hub via one of the contacts of the bus,
   wherein the sensor hub is to scan the contacts of the bus at a power-on of the apparatus, to determine an initial state of the bus,
   wherein the connection of the external sensor module to the apparatus via the bus comprises an insert event, wherein the disconnect of the external sensor module from the bus comprises a remove event, wherein the sensor hub is to determine that an electronic signal on the one of the contacts comprises the signal pattern that indicates the insert or remove event, and establish whether the insert or remove event manifests the connection of the external sensor module to the bus or disconnect of the external sensor module from the bus, based at least in part on a result of the determination of the signal pattern and further based on a result of the determination of the initial state of the bus.

2. The apparatus of claim 1, wherein the one of the contacts is a general purpose input-output (GPIO) pin.

3. The apparatus of claim 1, wherein the sensor hub is to perform a first procedure to initialize respective states of components of the sensor hub, or perform a second procedure to reset respective states of the components of the sensor hub, in response to the determination that the insert or remove event manifests the connection of the external sensor module to the bus or the disconnect of the external sensor module from the bus respectively.

4. The apparatus of claim 1, wherein the external sensor module includes one or more sensors and corresponding support circuitry, wherein the support circuitry includes a mating component to connect with the bus.

5. The apparatus of claim 1, wherein the processor comprises a host central processing unit (CPU), wherein the CPU, sensor hub, and signal pattern generation circuitry are integrated on a system on chip (SOC), wherein the apparatus comprises one of: a laptop computer, a desktop computer, a tablet computer, a smartphone, a set-top box, a game controller, or a wearable device.

6. The apparatus of claim 1, wherein the apparatus comprises a base sensor controller.

7. The apparatus of claim 1, wherein the one or more sensors include one or more of: an infrared (IR) sensor, a particle sensor, a temperature sensor, or gas sensor.

8. One or more non-transitory controller-readable media having executable instructions for facilitating a connection of an apparatus with an external sensor module stored thereon that, in response to execution, cause a controller to:
determine that an electronic signal provided to a bus of the apparatus comprises a signal pattern that indicates an insert or remove event associated with the external sensor module, which includes to identify falling edges of the signal pattern and time periods between the falling edges, wherein the bus is to provide a connection between the apparatus and the external sensor module; and
establish whether the insert or remove event manifests a connection of the external sensor module to the bus or a disconnect of the external sensor module from the bus, based at least in part on a result of the determination.

9. The non-transitory controller-readable media of claim 8, wherein the bus includes multiple contacts to connect the external sensor module with the apparatus, wherein the instructions further cause the controller to scan the contacts of the bus at a power-on of the apparatus, to determine an initial state of the bus,
wherein to establish whether the insert or remove event manifests the connection of the external sensor module to the bus or disconnect of the external sensor module from the bus is further based on a result of the determination of the initial state of the bus.

10. The non-transitory controller-readable media of claim 9, wherein the instructions further cause the controller to:
perform a first procedure to initialize respective states of the contacts of the bus, or
perform a second procedure to reset respective states of the contacts of the bus, in response to the determination that the insert or remove event manifests the connection of the external sensor module to the bus or the disconnect of the external sensor module from the bus respectively.

11. The non-transitory controller-readable media of claim 8, wherein the instructions further cause the controller to receive the electronic signal from the bus of the apparatus.

12. The non-transitory controller-readable media of claim 8, wherein the one or more sensors include one or more of: an infrared (IR) sensor, a particle sensor, a temperature sensor, or gas sensor.

* * * * *